United States Patent
Kim et al.

(10) Patent No.: US 11,698,893 B2
(45) Date of Patent: *Jul. 11, 2023

(54) SYSTEM AND METHOD FOR USE OF LOCK-LESS TECHNIQUES WITH A MULTIDIMENSIONAL DATABASE

(71) Applicant: Oracle International Corporation, Redwood Shores, CA (US)

(72) Inventors: Young Joon Kim, Stanford, CA (US); Vilas Ketkar, San Jose, CA (US); Shubhagam Gupta, Cupertino, CA (US); Haritha Gongalore, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,947

(22) Filed: Mar. 1, 2021

(65) Prior Publication Data

US 2021/0182266 A1    Jun. 17, 2021

Related U.S. Application Data

(63) Continuation of application No. 15/332,964, filed on Oct. 24, 2016, now Pat. No. 10,936,574.

(Continued)

(51) Int. Cl.
*G06F 16/00* (2019.01)
*G06F 16/23* (2019.01)
(Continued)

(52) U.S. Cl.
CPC ...... *G06F 16/2315* (2019.01); *G06F 16/2255* (2019.01); *G06F 16/283* (2019.01)

(58) Field of Classification Search
CPC .. G06F 16/283; G06F 12/121; G06F 16/2264; G06F 2212/401; G06F 12/0868;
(Continued)

(56) References Cited

U.S. PATENT DOCUMENTS 5,574,952 A    11/1996 Brady
5,915,129 A    6/1999 Slivka
(Continued)

OTHER PUBLICATIONS

Oracle, Oracle® Business Intelligence Cloud Service Data Sync, Getting Started, Release 2.2, Sep. 2016, Copyright © 2010, 2016, 6 pages.

(Continued)

*Primary Examiner* — Shyue Jiunn Hwa
(74) *Attorney, Agent, or Firm* — Tucker Ellis LLP

(57) ABSTRACT

In accordance with an embodiment, described herein is a system and method for use of lock-less data structures and processes with a multidimensional database computing environment. Lock-less algorithms or processes can be implemented with specific hardware-level instructions so as to provide atomicity. A memory stores an index cache retaining a plurality of index pages of the multidimensional database. A hash table indexes index pages in the index cache, wherein the hash table is accessible by a plurality of threads in parallel through application of the lock-less process.

20 Claims, 5 Drawing Sheets

Related U.S. Application Data

(60) Provisional application No. 62/245,912, filed on Oct. 23, 2015.

(51) Int. Cl.
*G06F 16/28* (2019.01)
*G06F 16/22* (2019.01)

(58) Field of Classification Search
CPC .... G06F 16/22; G06F 16/2246; G06F 16/245; G06F 16/254; G06F 16/282; G06F 2212/163; G06F 2212/1016; G06F 2212/206; G06F 2212/313; G06F 2212/465; G06F 9/5061; G06F 16/23; G06F 16/24539; G06F 16/24556; G06F 16/24562; G06F 16/248; G06F 16/258; G06F 9/5066; G06F 11/1451; G06F 12/023; G06F 12/084; G06F 12/0842; G06F 12/0866; G06F 12/00; G06F 16/2255; G06F 16/2315; G06F 15/02; G06F 15/04; G06F 18/10; G06F 18/20; G06F 17/00; G06F 18/00; G06F 1/00; G06F 1/02; G06F 1/04; G06F 1/16; G06F 1/24; G06F 1/26; G06F 5/01; G06F 5/06; G06F 9/02; G06F 9/04; G06F 9/06
See application file for complete search history.

(56) References Cited

U.S. PATENT DOCUMENTS

| | | | |
|---|---|---|---|
| 6,161,105 A | 12/2000 | Keighan | |
| 6,574,720 B1 | 6/2003 | Hopeman | |
| 6,629,102 B1 | 9/2003 | Malloy | |
| 6,766,325 B1 | 7/2004 | Pasumansky | |
| 6,873,994 B2 | 3/2005 | Kootale | |
| 7,133,876 B2 | 11/2006 | Roussopoulos | |
| 7,392,242 B1 | 6/2008 | Baccash | |
| 8,156,083 B2 | 4/2012 | Banerjee | |
| 8,386,296 B2 | 2/2013 | Hage | |
| 8,738,860 B1* | 5/2014 | Griffin | G06F 12/0897 711/122 |
| 10,083,195 B2 | 9/2018 | Zhou | |
| 10,318,498 B2 | 6/2019 | Tran | |
| 10,346,435 B2 | 7/2019 | Walker | |
| 10,360,527 B2 | 7/2019 | Abe | |
| 10,467,251 B2 | 11/2019 | Menon | |
| 10,936,574 B2 | 3/2021 | Kim | |
| 2002/0029207 A1 | 3/2002 | Bakalash | |
| 2003/0005420 A1 | 1/2003 | Ghosh | |
| 2004/0054858 A1 | 3/2004 | Chandrasekaran | |
| 2005/0262108 A1 | 11/2005 | Gupta | |
| 2006/0010159 A1 | 1/2006 | Mirchandani | |
| 2006/0085742 A1 | 4/2006 | Harold | |
| 2006/0106769 A1 | 5/2006 | Gibbs | |
| 2006/0271568 A1 | 11/2006 | Balkir | |
| 2007/0027674 A1 | 2/2007 | Parson | |
| 2007/0061344 A1 | 3/2007 | Dickerman | |
| 2007/0088691 A1 | 4/2007 | Dickerman | |
| 2007/0094668 A1 | 4/2007 | Jacquot | |
| 2008/0288524 A1 | 11/2008 | Dumitru | |
| 2009/0030915 A1 | 1/2009 | Winter | |
| 2009/0248651 A1 | 10/2009 | Perry | |
| 2009/0249125 A1 | 10/2009 | Bhatawdekar | |
| 2009/0276705 A1 | 11/2009 | Ozdemir | |
| 2010/0185703 A1* | 7/2010 | Ylonen | G06F 12/0269 707/816 |
| 2014/0046920 A1 | 2/2014 | Shuma | |
| 2014/0122413 A1 | 5/2014 | Presti | |
| 2017/0116032 A1 | 4/2017 | Tran | |
| 2017/0116215 A1 | 4/2017 | Ramaiyer | |
| 2017/0116281 A1 | 4/2017 | Roytman | |
| 2017/0116290 A1 | 4/2017 | Reichman | |
| 2017/0116308 A1 | 4/2017 | Alberg | |
| 2017/0116309 A1 | 4/2017 | Menon | |
| 2017/0116310 A1 | 4/2017 | Walker | |
| 2017/0116311 A1 | 4/2017 | Reichman | |
| 2017/0116312 A1 | 4/2017 | Reichman | |
| 2017/0116313 A1 | 4/2017 | Roytman | |
| 2018/0011893 A1* | 1/2018 | Kimura | G06F 16/283 |
| 2019/0073366 A1 | 3/2019 | Raimaiyer | |
| 2019/0079959 A1 | 3/2019 | Raimaiyer | |
| 2019/0102445 A1 | 4/2019 | Raimaiyer | |
| 2019/0102446 A1 | 4/2019 | Raimaiyer | |
| 2019/0102447 A1 | 4/2019 | Raimaiyer | |
| 2019/0258612 A1 | 8/2019 | Tran | |
| 2019/0286638 A1 | 9/2019 | Walker | |

OTHER PUBLICATIONS

Oracle, Oracle® Business Intelligence Cloud Service Data Sync, Read Me, Release 2.2, Sep. 2016, Copyright © 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

European Patent Office, International Searching Authority, International Search Report and Written Opinion dated Nov. 29, 2019 for International Application No. PCT/US19/56363, 16 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_I4gCQ&q=%22dynamic+flow+process%22+definition&oq=%22dynamic•flow+process%22+definition&gs I=psy-ab .3 ... 38876 .39886 .. 40199 ... 0 .0 .. 0. 76.437 .8 ...... 0 .... 1 .. gws-.viz ....... Oi71 j0i7i30j0i30j0i8i30.

Dynamic Flow process OLAP Nov. 26, 2018, google.com, https://www.google.com/search?biw=1920&bih=1076&ei=njv8W_CJD4mizwK_I4gCQ&q=%22dynamic+flow+process%22+definition&oq=%22dynamic•flow+process%22+definition&gs I=psy-ab .3 ... 38876 .39886 .. 40199 ... 0 .0 .. 0. 76.437 .8 ...... 0 .... 1 .. gws-.viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189 04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

(56) References Cited

OTHER PUBLICATIONS

Iankovszky, Andra et al., Edgewater Ranzal, Oracle Platinum Consulting Partner, "The Uncharted Territory Ready to be Discovered: Hybrid Essbase", Hyperion Ukoug, Jun. 18, 2015, 24 pages.

Michael, Maged M., "High Performance Dynamic Lock-Free Hash Tables and List-Based Set", SPAA '02, Aug. 10-13, 2002, Winnipeg, Manitoba, Canada, Copyright 2002, 10 pages.

Michael, Maged M, et al., "Simple, Fast, and Practical Non-Blocking and Blocking Concurrent Queue Algorithms", Department of Computer Science, University of Rochester, Rochester, NY, 1996, 9 pages.

* cited by examiner

SYSTEM AND METHOD FOR USE OF LOCK-LESS TECHNIQUES WITH A MULTIDIMENSIONAL DATABASE

CLAIM OF PRIORITY

This application is a continuation of U.S. Patent Application entitled "SYSTEM AND METHOD FOR USE OF LOCK-LESS TECHNIQUES WITH A MULTIDIMENSIONAL DATABASE", application Ser. No. 15/332,964, filed Oct. 24, 2016 which claims priority to U.S. Provisional Application titled "SYSTEM AND METHOD FOR USE OF LOCK-LESS TECHNIQUES WITH A MULTIDIMENSIONAL DATABASE", Application No. 62/245,912, filed Oct. 23, 2015; which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to online analytical processing and multidimensional database computing environments, and to systems and methods for supporting use of lock-less algorithms to improve concurrency.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for use with a multidimensional database (e.g, Essbase) computing environment. To improve performance, lock-less algorithms and data structures can be implemented for the multidimensional database. The lock-less algorithms can be implemented with specific hardware-level instructions so as to provide atomicity. With the removal of lock contention, concurrency is improved.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
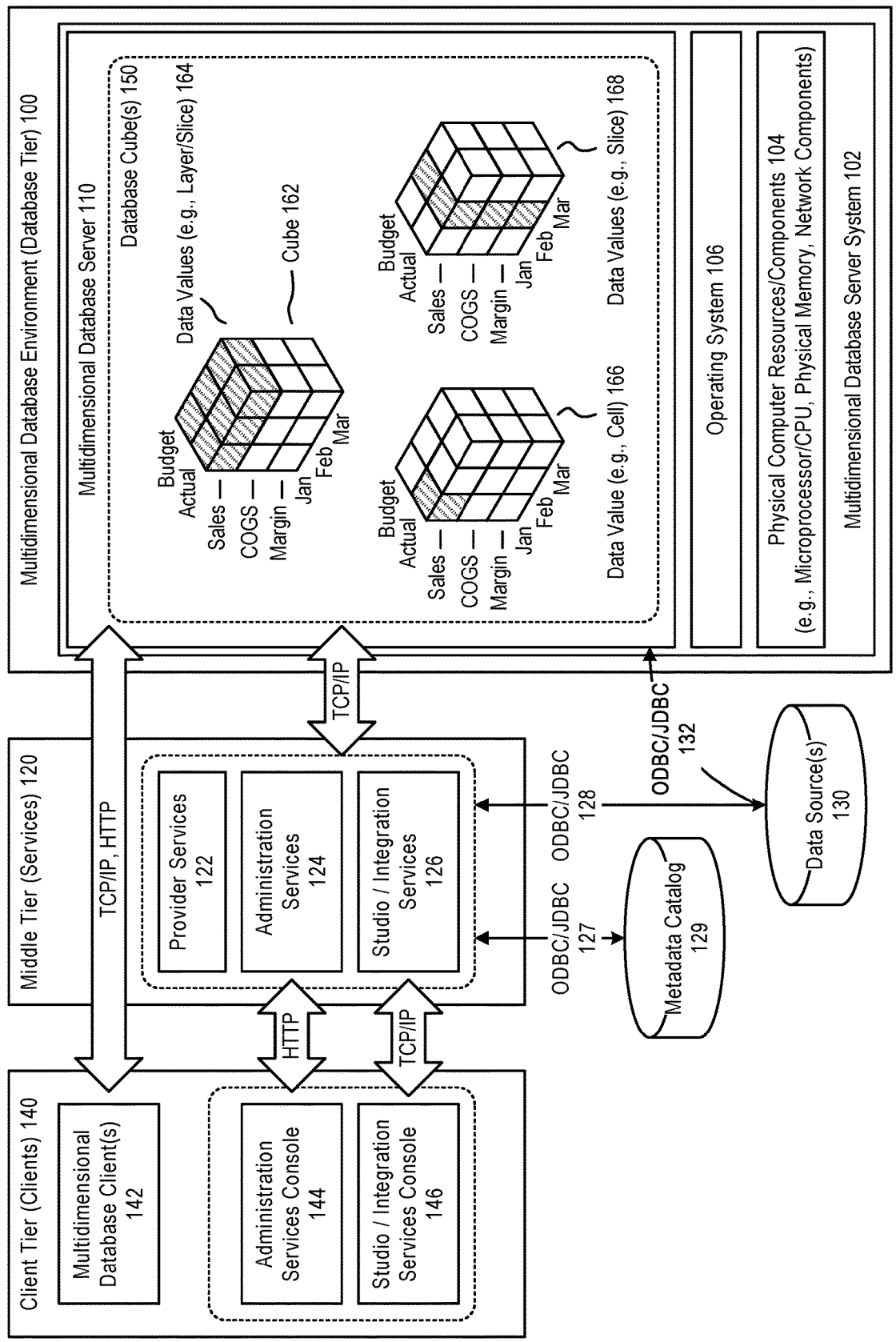
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-In

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Lock-Less Data Structures

In accordance with an embodiment, described herein is a system and method for use with a multidimensional database (e.g, Essbase) computing environment. To improve performance, lock-less algorithms and data structures can be implemented for the multidimensional database. The lock-less algorithms can be implemented with specific hardware-level instructions so as to provide atomicity. With the removal of lock contention, concurrency is improved.

A traditional approach to multi-threaded programming uses locks to synchronize access to shared resources. Synchronization techniques, like locks, enables a software developer to ensure that certain sections of code do not execute concurrently. For example, if concurrent execution, but disparate threads or processing cores, would corrupt shared data structures, concurrent execution should be controlled. In the case of locks, however, when one thread attempts to acquire a lock that is already held by another thread, then that thread will block until the lock is free. A blocked thread is undesirable. For instance, while a thread is blocked, the thread cannot perform other tasks. As such, in a situation where the blocked thread is performing a high-priority or real time task, a significant penalty can be incurred by halting its progress.

The computing machines that are used to run various multidimensional databases are becoming increasingly larger and more complex in terms of the number of processing cores available. In a machine with a large number of cores, contention with traditional synchronization techniques increases. The increased contention lowers efficiency and performance since a greater number of threads are idle waiting for locks. Accordingly, data structures and algorithms that operate in a lock-free manner overcome these shortcomings.

In accordance with an embodiment, a lock-less data structure can improve scalability on multi-cored processors and/or multi-threaded systems. Lock-less or lock-free algorithms can be used to accomplish work efficiently within each core, without other tasks waiting a disproportionate amount of time for another task running on another core. Such algorithms can also provide a way to scale up to a greater number of cores.

Support for Lock-Less Algorithms in Multidimensional Database Environments

Figure 2:
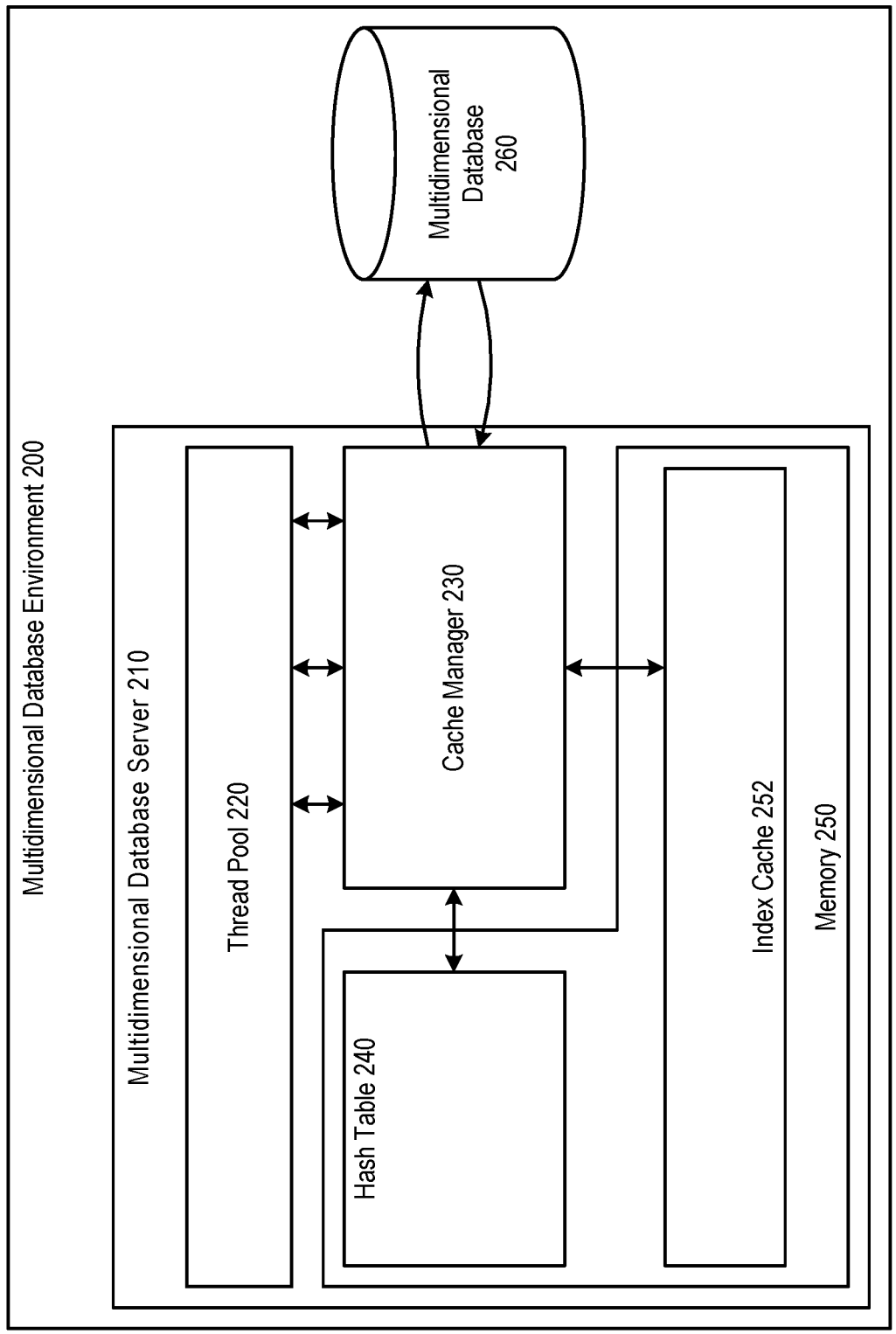
FIG. 2 illustrates lock-free data structures within a multidimensional database environment in accordance with an embodiment.
Figure 3:
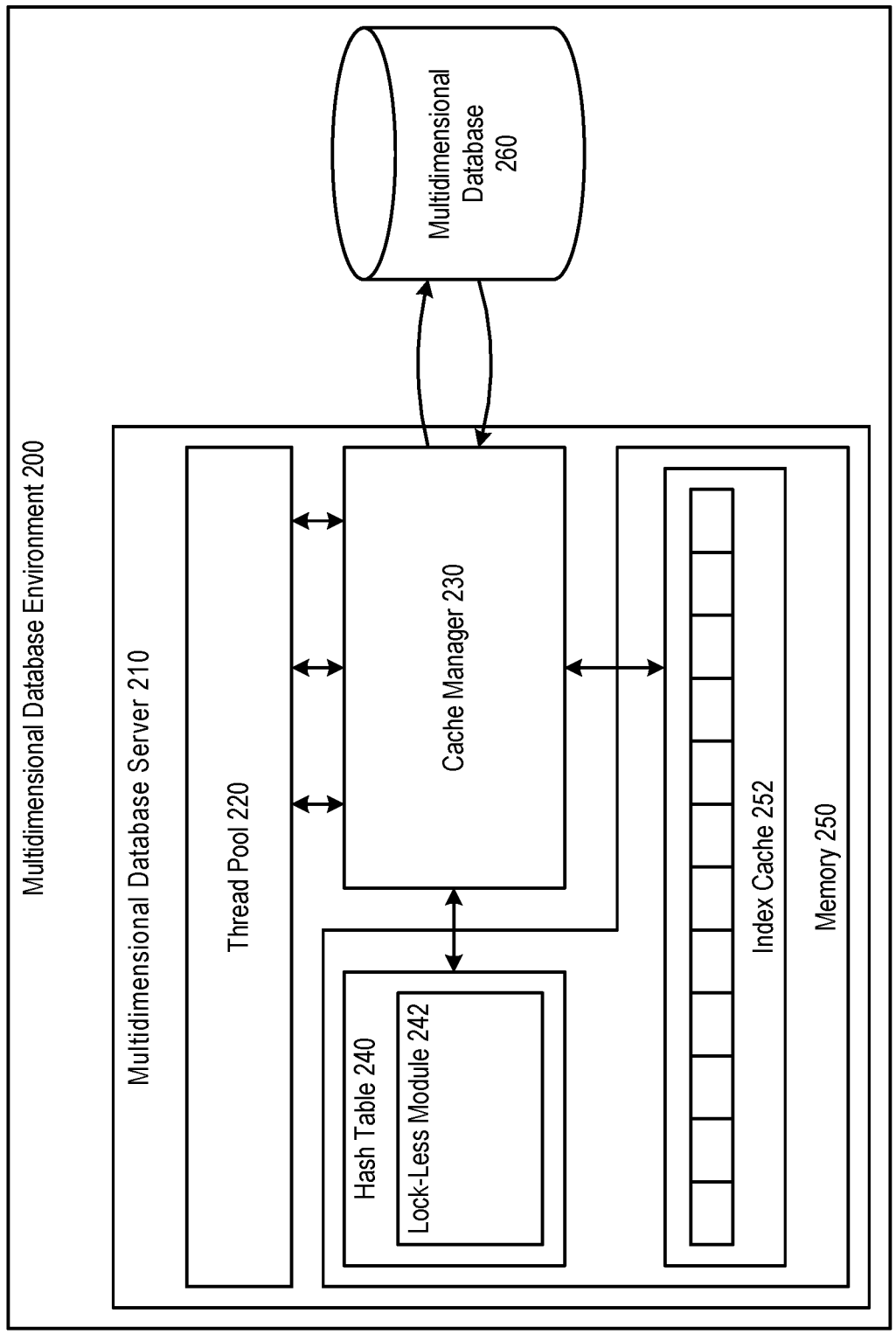
FIG. 3 further illustrates lock-free data structures within a multidimensional database environment in accordance with an embodiment.
Figure 4:
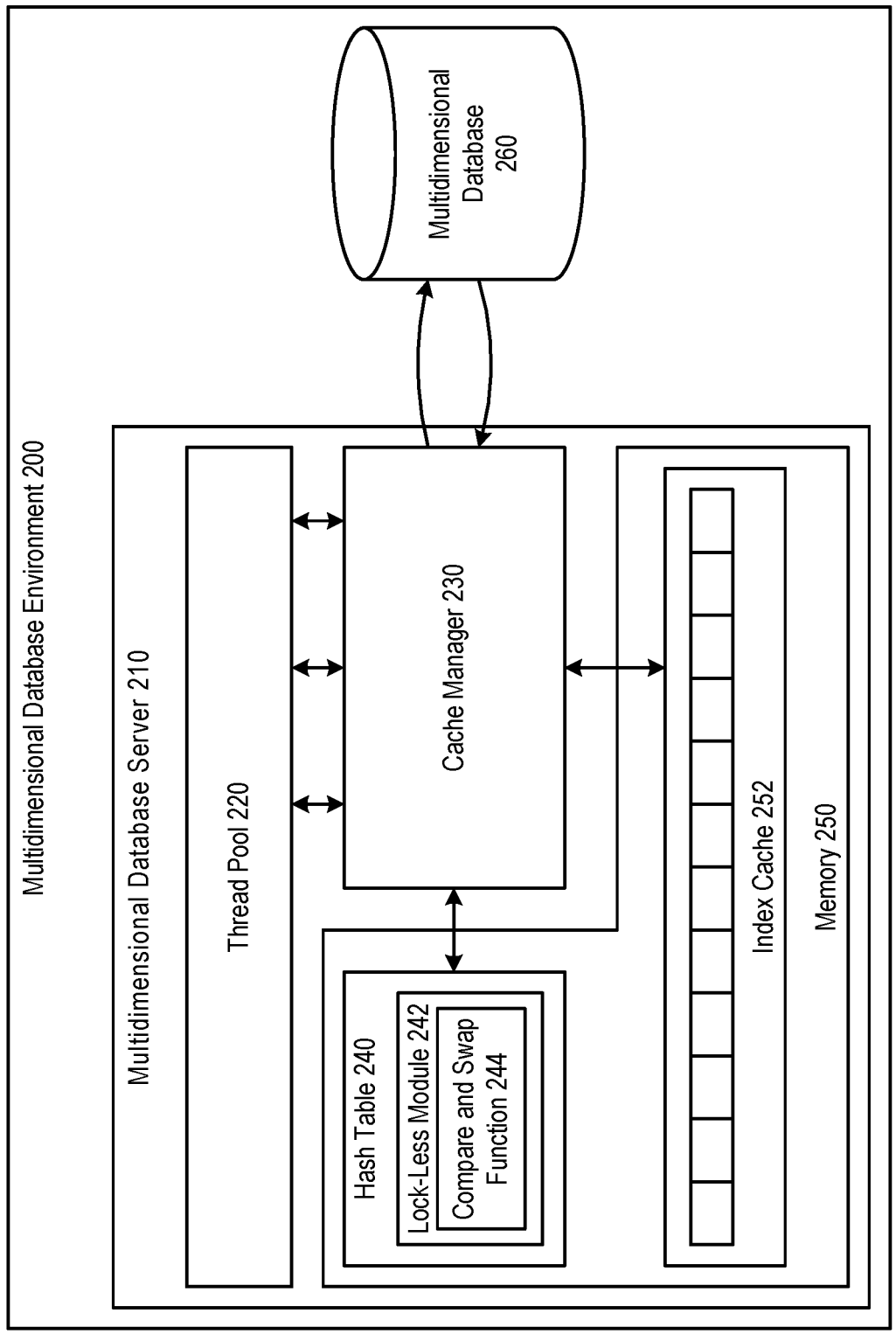
FIG. 4 further illustrates lock-free data structures within a multidimensional database environment in accordance with an embodiment.

FIGS. 2-4 illustrate use of lock-free data structures within a multidimensional database environment in accordance with an embodiment.

Turning initially to FIG. 2, a multidimensional database environment 200 can include a database server 210. According to an example, the database server 210 can include a plurality of processing cores or provide a multi-threaded environment so as to enable concurrency. A thread pool 220 can include a plurality of threads that concurrently perform calculations, data loads, or other operations on a multidimensional database. In particular, threads of thread pool 220 operate on index pages stored in an index cache 252 of memory 250. Index pages refer to the location of data blocks on disk.

In accordance with an embodiment, a thread in the multidimensional database environment 200 can commence an operation on a data block. The thread requests a cache manager 230 for an index page in the index cache 252, if available. The cache manager 230, responsive to the request, can access a hash table 240 to determine if an index page that refers to the data block is in the index cache 252.

For example, a key associated with the index page can be hashed (i.e., passed through a hash function) to determine a corresponding location or bucket of the hash table 240. If the index page is in index cache 252, the corresponding bucket will include relevant information associated with the index page. If the index page is not present in the index cache 252, the cache manager 230 reads in the index page from storage 260 and updates the hash table 240 accordingly. As thread pool 220 can include a plurality of threads, the foregoing operations can be carried out concurrently by multiple threads at a time.

In accordance with an aspect, collisions, which arise due to the hash function mapping disparate keys to a same hash value, can be resolved with a linked list associated with each bucket. Once a particular bucket is identified for a given key, the associated linked list is traversed to determine whether there is a hit on the index cache. Further, other operations on the linked list, such as an insert operation or a delete operation are performed when an index page is added or removed from the index cache 252.

When the potential of concurrency increases, by increasing a number of threads or increasing a number of processing cores, the level of contention on the hash table 240 also increases. To avoid blocking threads, and thus decreasing performance, hash table 240 can include a lock-less module 242 as shown in FIG. 3. The lock-less module 242 enhances an implementation of hash table 240 to utilize lock-less algorithms so that a plurality of threads of thread pool 220 can concurrently access and modify entries of hash table 240 without blocking. That is, without synchronizing on locks, contention is reduced and more efficiently managed. In accordance with an embodiment, the linked lists, associated with each bucket of the hash table 240, are implemented with lock-less functionality.

In accordance with an embodiment, as shown in FIG. 4, lock-less module 242 utilizes a compare-and-swap function 244 to enable lock-less algorithms. In general, the compare-and-swap function 244 operates to verify that a state of a data structure is in an expected state before completing an operation. To avoid contention and provide lock-free access, the compare-and-swap function 244 is performed atomically. According to an embodiment, the compare-and-swap function 244 is implemented with specific CPU or other hardware-level instructions.

In accordance with an embodiment, an operand to the compare-and-swap instruction is augmented to include a counter. The counter addresses a situation where a data structure is changed one or more times while a particular thread of execution prepares to compare-and-swap. After the changes by other threads, a possibility exists that a new state of the data structure is similar enough to match an old state of the data structure that will be compared against. In such cases, completing a subsequent compare-and-swap could corrupt the data structure. Accordingly, in addition to checking the data structure against an expected state, the compare-and-swap function further checks a counter value. If the counter does not match, but the expected state does match, then the thread determines that a false positive has occurred. Accordingly, the compare-and-swap does not complete and the thread attempts again. If both the expected state and counter match, then the compare-and-swap occurs and the associated counter is incremented.

In accordance with an embodiment, a thread, seeking to find an index page in the index cache 252, will identify the appropriate bucket of hash table 240 where relevant information for the index page can be found, if available. The thread subsequently traverses an associate linked list to determine whether the index page is available in the index cache 252. The traversal of the linked list utilizes the compare-and-swap function 244 with a lock-free search algorithm.

Similarly, when an index page is added to the index cache 252, an insert operation is performed on the appropriate linked list associated with the bucket of hash table 240 mapped to the data block. As before, to provide lock-free access, the insert operation atomically executes the compare-and-swap function 244 to ensure the data structure is in an expected state before modification. Further, when an index page is removed from the index cache 252, a delete operation is utilized, which also relies on the compare-and-swap function 244.

Figure 5:
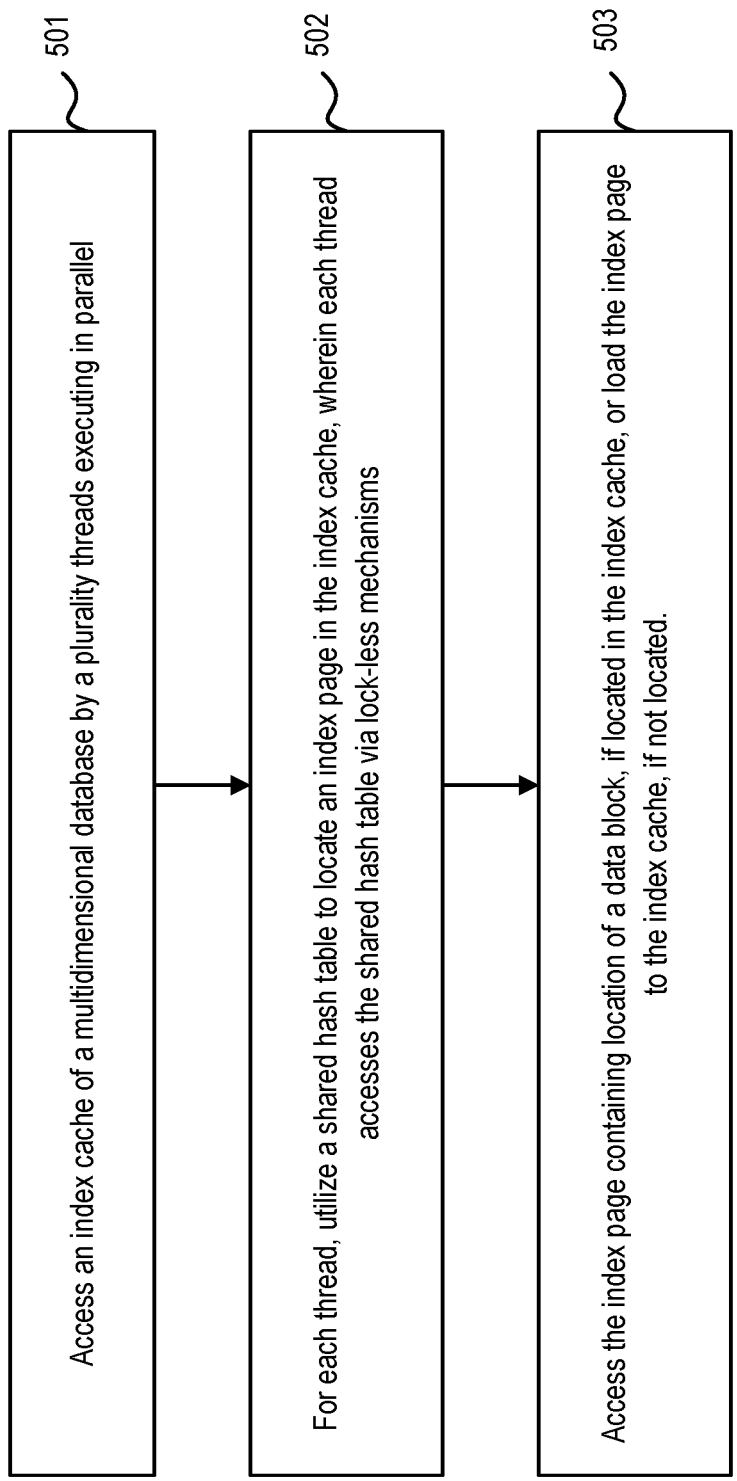
FIG. 5 illustrates a flow chart describing illustrates lock-free data structures within a multidimensional database environment in accordance with an embodiment.

FIG. 5 illustrates a flow chart describing illustrates lock-free data structures within a multidimensional database environment in accordance with an embodiment. At step 501, an index cache of a multidimensional database is accessed, in parallel, by a plurality of threads.

At step 502, each thread of the plurality of thread utilizes a shared hash table to locate an index page in the index cache. Each thread accesses the shared hash table via lock-less mechanisms. For instance, the hash table operations invoked by the threads can utilize lock-less algorithms based on an atomic compare-and-swap function.

At step 503, the respective index page is accessed by each thread, if found. Otherwise, the index page is loaded to the index cache. By loading the index page to the index cache, the thread modifies the hash table to presence of the index page with relevant information. Like the hash table search, the modification operations also utilize lock-free algorithms based on the compare-and-swap function.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting data access in a database server within a multidimensional database environment, the database server comprising a processor and a memory and having access to a storage containing a plurality of data blocks wherein each of the plurality of data blocks is associated with a corresponding index page and a key, the method comprising:

providing, in said memory, a hash table comprising a plurality of linked lists and a plurality of buckets, wherein one of said plurality of linked lists is associated with each of the plurality of buckets;

providing an index cache in said memory;

accessing the index cache concurrently by a plurality of threads;

for each thread, of the plurality of threads:

commencing an operation against a particular data block of the plurality of data blocks, wherein the particular data block is associated with a particular key and a particular index page;

identifying in the hash table a particular bucket associated with the particular index page by performing a hash function on the particular key associated with the particular data block;
traversing the linked list associated with the identified particular bucket using a compare-and-swap function that executes atomically to search for the particular index page corresponding to the data block;
responsive to the search finding the particular index page corresponding to the data block, returning a pointer to the data block in said index cache from the index page corresponding to the data block in said index cache;
responsive to the search not finding the particular index page corresponding to the data block, loading the index page corresponding to the data block from said storage into said index cache.

2. The method of claim 1, further comprising updating the hash table upon loading the particular index page corresponding to the particular data block from said storage into said index cache.

3. The method of claim 1, wherein the compare-and swap function compares a counter and a counter value to determine whether the linked list is in an expected state prior to performing the operation.

4. The method of claim 1, wherein the corresponding index page associated with said each of the plurality of data blocks represents combinations of sparse dimension members in the multidimensional database environment.

5. The method of claim 1, further comprising performing operations on the linked list associated with the identified particular bucket.

6. The method of claim 5, wherein performing operations on the linked list comprises performing at least one of a lockless insert operation, and a lockless delete operation.

7. The method of claim 1, further comprising executing the compare-and-swap function by executing specific hardware instructions.

8. A system for supporting data access within a multidimensional database environment, the method comprising:
a database server comprising a processor and a memory and having access to a storage containing a plurality of data blocks wherein each of the plurality of data blocks is associated with a corresponding index page and a key;
a hash table in said memory of the database server comprising a plurality of linked lists and a plurality of buckets, wherein one of said plurality of linked lists is associated with each of the plurality of buckets;
an index cache in said memory of the database server;
a plurality of threads operating on said database server to access the index cache concurrently;
wherein each of the plurality of threads is configured to:
commence an operation against a particular data block of the plurality of data blocks, wherein the particular data block is associated with a particular key and a particular index page;
identify in the hash table a particular bucket associated with the particular index page by performing a hash function on the particular key associated with the particular data block;
traverse the linked list associated with the identified particular bucket using a compare-and-swap function that executes atomically to search for the particular index page corresponding to the data block;
responsive to the search finding the particular index page corresponding to the data block, return a pointer to the data block in said index cache from the index page corresponding to the data block in said index cache;
responsive to the search not finding the particular index page corresponding to the data block, load the index page corresponding to the data block from said storage into said index cache.

9. The system of claim 8, wherein the hash table is updated upon loading the particular index page corresponding to the particular data block from said storage into said index cache.

10. The system of claim 8, wherein the compare-and swap function compares a counter and a counter value to determine whether the linked list is in an expected state prior to performing the operation.

11. The system of claim 8, wherein the corresponding index page associated with said each of the plurality of data blocks represents combinations of sparse dimension members in the multidimensional database environment.

12. The system of claim 8, further comprising performing operations on the linked list associated with the identified bucket.

13. The system of claim 12, wherein performing operations on the linked list comprises performing at least one of a lockless insert operation, and a lockless delete operation.

14. The system of claim 8, wherein the compare-and-swap function is performed by executing specific hardware instructions on the processor.

15. A non-transitory computer-readable medium having instructions stored thereon for supporting data access in a database server within a multidimensional database environment server comprising a processor and a memory and having access to a storage containing a plurality of data blocks each associated with a corresponding index page and a key, which instructions, when executed on the database server, cause the database server to perform steps comprising:
providing, in said memory, a hash table comprising a plurality of linked lists and a plurality of buckets, wherein one of said plurality of linked lists is associated with each of the plurality of buckets;
providing an index cache in said memory;
accessing the index cache concurrently by a plurality of threads;
for each thread, of the plurality of threads:
commencing an operation against a particular data block of the plurality of data blocks, wherein the particular data block is associated with a particular key and a particular index page;
identifying in the hash table a particular bucket associated with the particular index page by performing a hash function on the particular key associated with the particular data block;
traversing the linked list associated with the identified particular bucket using a compare-and-swap function that executes atomically to search for the particular index page corresponding to the data block;
responsive to the search finding the particular index page corresponding to the data block, returning a pointer to the data block in said index cache from the index page corresponding to the data block in said index cache;
responsive to the search not finding the particular index page corresponding to the data block, loading the index page corresponding to the data block from said storage into said index cache.

16. The non-transitory computer-readable medium of claim 15, the steps further comprising:
updating the hash table upon loading the particular index page corresponding to the particular data block from said storage into said index cache.

17. The non-transitory computer-readable medium of claim 16, wherein the compare-and swap function compares a counter and a counter value to determine whether the linked list is in an expected state prior to performing the operation.

18. The non-transitory computer-readable medium of claim 16, wherein the corresponding index page associated with said each of the plurality of data blocks represents combinations of sparse dimension members in the multidimensional database environment.

19. The non-transitory computer-readable medium of claim 16, the steps further comprising performing operations on the linked list associated with the identified particular bucket.

20. The non-transitory computer-readable medium of claim 19, wherein performing operations on the linked list comprises performing at least one of a lockless insert operation, and a lockless delete operation.

* * * * *

UNITED STATES PATENT AND TRADEMARK OFFICE
CERTIFICATE OF CORRECTION

PATENT NO. : 11,698,893 B2
APPLICATION NO. : 17/188947
DATED : July 11, 2023
INVENTOR(S) : Kim et al.

Page 1 of 1

It is certified that error appears in the above-identified patent and that said Letters Patent is hereby corrected as shown below:

On the Title Page

On page 2, Column 2, under Other Publications, Line 17, delete "hllps:" and insert -- https: -- therefor.

On page 2, Column 2, under Other Publications, Line 55, delete "retreived" and insert -- retrieved -- therefor.

In the Claims

In Column 9, Line 23, delete "compare-and swap" and insert -- compare-and-swap -- therefor.

Signed and Sealed this
Twenty-ninth Day of October, 2024

Katherine Kelly Vidal
*Director of the United States Patent and Trademark Office*